United States Patent [19]

Mellott

[11] Patent Number: 5,175,847
[45] Date of Patent: Dec. 29, 1992

[54] COMPUTER SYSTEM CAPABLE OF PROGRAM EXECUTION RECOVERY

[75] Inventor: Robert N. Mellott, Palo Verdes Est., Calif.

[73] Assignee: Logicon Incorporated, Torrance, Calif.

[21] Appl. No.: 585,803

[22] Filed: Sep. 20, 1990

[51] Int. Cl.$^5$ .............................................. G06F 11/00
[52] U.S. Cl. .................................. 395/575; 364/271.2; 364/273.4; 364/DIG. 1; 371/12; 371/66
[58] Field of Search ...................... 371/68.3, 68.2, 67.1, 371/66, 12; 364/269, 228.3, 285.3, 273.4, 271.2; 395/575

[56] References Cited

U.S. PATENT DOCUMENTS

| | | | |
|---|---|---|---|
| 3,409,875 | 11/1968 | De Jager et al. | 371/8.2 |
| 3,810,119 | 5/1974 | Zieve et al. | 364/200 |
| 4,049,957 | 9/1977 | Kera et al. | 371/68.3 |
| 4,196,470 | 4/1980 | Berg | 364/200 |
| 4,222,515 | 9/1980 | Strelow | 371/68.3 |
| 4,916,696 | 4/1990 | Funakubo | 371/11.3 |
| 4,945,486 | 7/1990 | Nitschke et al. | 364/431.11 |
| 5,038,276 | 8/1991 | Bozzetti et al. | 364/200 |

*Primary Examiner*—Charles E. Atkinson
*Attorney, Agent, or Firm*—Freilich, Hornbaker & Rosen

[57] ABSTRACT

A computer system having two processors (22, 24) with the capability of recovering program execution after a power supply interruption. The processors execute identical programs having executable segments. Control means (26) uses storage registers (38) to write segment initial instruction addresses into the trailing processor's program counter (34) so as to cause the processors to execute in adjacent segments. The control means also uses program wait loops to cause the processors to initiate the execution of each segment synchronously. The processors write to the same program variable, in a non volatile RAM (66, 76), only in alternate segments so that one processor, executing in an adjacent segment, forms a source of unaltered variable values for the other to use in recovering from a power interruption. A status register (36) provides segment completion status and a recovery table in a read only memory (62, 72) provides a list of variables that may be altered in each segment. After a power interruption the status register identifies the storage register to use for initial segment instruction addresses and the segment in the recovery table for variable identification. The processors may then obtain variable values from the non volatile RAM and recover segment execution. The system configuration also provides fault tolerance and self checking capabilities.

32 Claims, 7 Drawing Sheets

FIG. 1A

EXECUTION OF
PROGRAM SEGMENTS
BY LEADING AND TRAILING PROCESSORS 22, 24
AS CONTROLLED BY THE CONTROL INTERFACE 26

| OTHER PROCESSOR OUT SIR INSTRUCTION EXECUTED | | | OTHER PROCESSOR OUT SIR INSTRUCTION NOT EXECUTED | | |
|---|---|---|---|---|---|
| PROGRAM COUNT VALUE | SYMBOLIC INSTRUCTION | COMMENTS | PROGRAM COUNT VALUE | SYMBOLIC INSTRUCTION | COMMENTS |
| 1000 | OUT SIR | identifies segment completion | 1000 | OUT SIR | identifies segment completion |
| 1001 | JMP PC + 1 | SIR loop | 1001 | JMP PC + 1 | SIR loop |
| 1002 | XXX | first segment instruction | 1001 | JMP PC + 1 | SIR loop |

FIG. 5A

WAIT LOOP
(SIR LOOP)

| STATUS LOW 4 - BIT | | | | | SIR REGISTERS TO BE USED | | | |
|---|---|---|---|---|---|---|---|---|
| LP 22 | | TP 24 | | | LP 22 | | TP 24 | |
| Start Seg. Bit 3 | SIR Loop Bit 2 | Start Seg. Bit 1 | SIR Loop Bit 0 | HEX | Variable Update | Resume Execution | Variable Update | Comments |
| 0 | 0 | 0 | 0 | 0 | A | A | C | |
| 0 | 0 | 0 | 1 | 1 | | | | Should not occur |
| 0 | 0 | 1 | 0 | 2 | A | A | NR | |
| 0 | 0 | 1 | 1 | 3 | A | A | NR | |
| 0 | 1 | 0 | 0 | 4 | NR | A | C | SIRB = SIRC |
| 0 | 1 | 0 | 1 | 5 | NR | A | C | SIRB = SIRC |
| 0 | 1 | 1 | 0 | 6 | NR | A | B | |
| 0 | 1 | 1 | 1 | 7 | NR | A | C | SIRB = SIRC |
| 1 | 0 | 0 | 0 | 8 | B | B | C | |
| 1 | 0 | 0 | 1 | 9 | | | | Should not occur |
| 1 | 0 | 1 | 0 | A | B | B | NR | |
| 1 | 0 | 1 | 1 | B | B | B | NR | |
| 1 | 1 | 0 | 0 | C | NR | A | C&B | TP requires two segment updates |
| 1 | 1 | 0 | 1 | D | | | | Should not occur |
| 1 | 1 | 1 | 0 | E | NR | A | B | |
| 1 | 1 | 1 | 1 | F | NR | A | C | |

NR = not required
do not update variables

COMPUTER SYSTEM CAPABLE OF PROGRAM EXECUTION RECOVERY

FIELD OF THE INVENTION

The present invention pertains to general purpose computer systems, and more particularly, to computer systems having the capability of recovering program execution after a power interruption.

BACKGROUND OF THE INVENTION

Successful program execution in computer systems is vulnerable to power supply interruptions which may, in the case of military applications, be initiated by detectors which respond to radiation induced by a nuclear event. That is, in order to avoid damaging effects to circuits susceptible to surge currents which can be caused by the event, radiation detectors are typically incorporated to rapidly switch off power to those circuits. There is, therefore, insufficient time after the detection of an event to prepare the system for recovery. The ability to reestablish program execution after such an event is known as circumvention recovery.

At least two design methods have been investigated to achieve recovery from such an interruption. One is known in the art as "snapshot" and involves the processor saving critical data to a hardened memory as each program instruction is executed. This data may then be used for recovery after an event. This technique, however, requires a large amount of additional processing in normal operation to execute the extra instructions required. Since the occurrence of a nuclear event cannot be known in advance, this extra processing represents a burden to normal system activity at all times rather than only when circumvention recovery is required.

The second known method for circumvention recovery is called "rollback" because the program is constructed so as to establish "rollback points". These points are like safe harbors with critical data saved that the processor can use to begin re-execution of the program. This method causes the system design to become more complex and entails the execution of more program instructions to prepare for rollback at each point.

A variation of the snapshot technique is used to survive a fault that renders a portion of the main computer memory inoperative. Fault tolerant systems often prepare for such a fault by writing data to two memory units so as to have a backup. Because this slows the system down considerably an optional method has been used in which a second area in memory is updated only periodically. However, if a fault occurs during the copying operation to the second area the data in both locations may be suspect. An example of a technique using two backup areas in memory to correct this problem is given in U.S. Pat. No. 4,654,819 to Stiffler, et al.

An example of a rollback technique is given by U.S. Pat. No. 4,751,639 to Corcoran et al. disclosing a system which uses dual processors for the detection of faults. Both processors execute the same program. A miscomparison circuit compares the data after the execution of each instruction. If the miscomparison circuit detects that the processor outputs do not agree, the programs of both processors are rolled back so that they execute the same instruction again. If the error was caused by a transient of some nature, the results of the second execution should be successful and the program may proceed.

Other relevant material is discussed in U.S. Pat. No. 3,536,259, U.S. Pat. No. 3,950,729, U.S. Pat. No. 4,251,863, U.S. Pat. No. 4,270,168, U.S. Pat. No. 4,330,826, U.S. Pat. No. 4,354,230, U.S. Pat. No. 4,356,546, U.S. Pat. No. 4,377,000, U.S. Pat. No. 4,412,280, U.S. Pat. No. 4,428,048, U.S. Pat. No. 4,453,215, U.S. Pat. No. 4,455,602, U.S. Pat. No. 4,484,275, U.S. Pat. No. 4,575,842, U.S. Pat. No. 4,581,701, U.S. Pat. No. 4,590,554, U.S. Pat. No. 4,607,365, U.S. Pat. No. 4,622,667, U.S. Pat. No. 4,634,110, U.S. Pat. No. 4,644,496, U.S. Pat. No. 4,645,459, U.S. Pat. No. 4,750,177, U.S. Pat. No. 4,805,095, U.S. Pat. No. 4,814,982, U.S. Pat. No. 4,816,989, U.S. Pat. No. 4,816,990, U.S. Pat. No. 4,817,091, U.S. Pat. No. 4,819,154, U.S. Pat. No. 4,819,232, U.S. Pat. No. 4,821,212, U.S. Pat. No. 4,823,256, U.S. Pat. No. 4,823,261, U.S. Pat. No. 4,860,192, U.S. Pat. No. 4,860,606, U.S. Pat. No. 4,868,744, U.S. Pat. No. 4,875,155, and U.S. Pat. No. 4,885,680.

SUMMARY OF THE INVENTION

The present invention is directed to a multiple processor computer system in which each processor executes a program comprised of sequential program segments, e.g. processor one executes segments N, N+1, N+2, - - -N+N and processor two executes segments M, M+1, M+2, - - -M+M and wherein the system includes means for causing the processors to initiate program segments synchronously.

Embodiments of the invention are particularly suited for applications requiring reestablishing program execution after a power shutdown. Such systems are characterized by the use of at least two separate processors and control interface logic which causes the processors to execute the same program but offset in real time with respect to one another by at least one sequential program segment. That is, execution of a segment by the trailing processor is deferred until the leading processor has completed execution of that segment.

In a preferred embodiment, the control interface logic includes three segment identification registers for holding segment initial instruction addresses. The address held in a first register is written into the program counter of a first processor when the first processor enters a segment start. The address held in the first register is copied to the second register when the first processor leaves the segment start. The address held in the third register is copied from the second register when the second processor enters a segment start and is also written into the second processor's program counter. The addresses identify initial instructions in adjacent program segments.

Thus the second processor is always instructed to execute the segment just executed by the first processor. Because of this relationship of program segment execution, the first processor will hereinafter be referred to as the leading processor and the second as the trailing processor. In operation, the trailing processor waits while the leading processor executes the first segment.

The preferred system embodiment also includes a status register that reports on the status of both processor's segment execution. The processor to first complete its segment execution is placed in a wait loop until segment completion by the other processor. The processors initiate execution of their respective segments at the same time.

The preferred system embodiment stores a recovery table in read only memory listing addresses of those program variables that may be changed in each program segment. The variables themselves are stored in a read-write section of random access memory. In addition the processors observe a rule to never write to the same program variable in adjacent program segments. This insures that the leading processor can always go back to the beginning of the segment under execution and re-execute after retrieving the segment's initial variable values from the trailing processor.

If program execution is interrupted, each processor examines the status register to determine the status of segment execution at the time of interruption. The basic possible execution status conditions are:
1) Both processors had completed segment execution
2) Neither processor had completed segment execution
3) Leading processor had completed segment execution but the trailing processor had not
4) Trailing processor had completed segment execution but the leading processor had not Following a recovery process, program execution is resumed in the same manner that it was initially started. That is, except for a different "first" segment, the trailing processor waits while the leading processor executes the segment. The recovery process corresponding to the execution status conditions above are:
1) The trailing processor gets segment variable results from the leading processor by identifying the segment. It is the segment that the leading processor just executed.
2) Again, the trailing processor gets segment variable results from the leading processor. It is from the last segment that the leading processor had completely executed. The leading processor gets segment variable initial values from the trailing processor by identifying the segment. This allows the leading processor to re-execute the segment, producing the same results.
3) The trailing processor gets segment variable results from the last two segments that the leading processor had executed.
4) The leading processor gets segment variable initial values from the trailing processor by identifying the segment. This allows the leading processor to re-execute the segment, producing the same results.

The segment identification registers and status register directs the processors to the recovery table in read only memory for variable identification after which the values of those variables can be retrieved. These registers also determine where the leading processor begins execution after the recovery process is completed.

A system in accordance with the invention may also be used for self checking routines since each processor is executing the same program. By delaying the results of instruction execution in the leading processor, a comparison may be made with the result of the same execution in the trailing processor.

The system also has fault tolerant capabilities since either processor can execute the program by itself. The failure of one processor would still leave the other to complete program execution.

Alternative embodiments of the invention can include a third processor which executes segments offset (delayed) from the trailing processor. Such embodiments allow voting to determine which two processors should continue if one fails.

It should be apparent to one skilled in the art that the inventive concept includes apparatus and method for synchronization of program segment execution by two or more processors using two instruction statements common to most processor instruction sets.

DETAILED DESCRIPTION

Figure 1A:
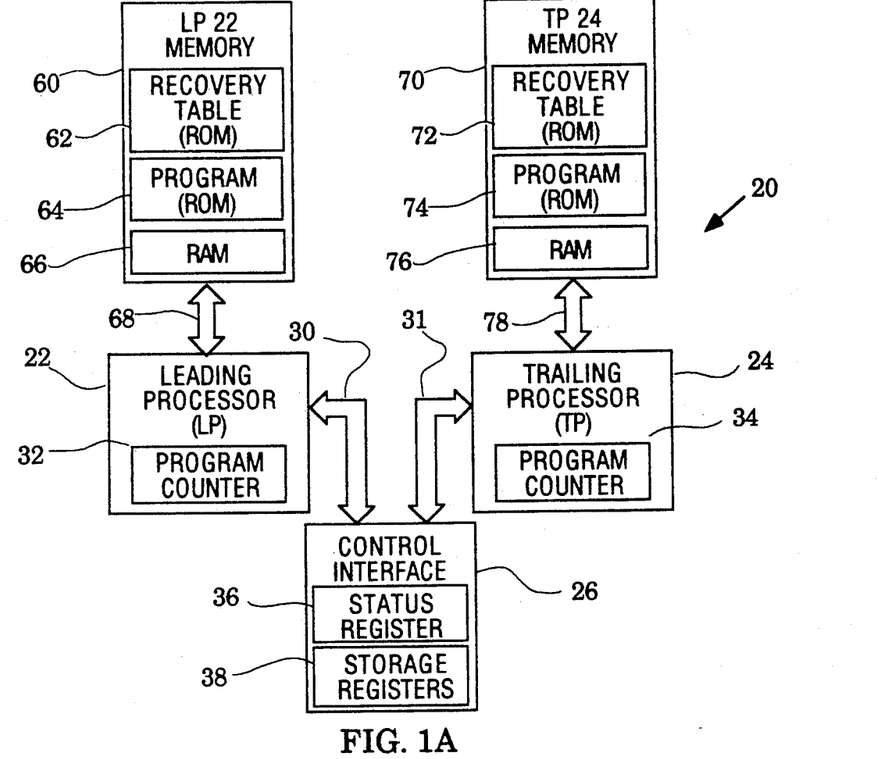
FIG. 1A illustrates a block diagram and FIG. 1B a segment execution diagram of a computer system, in accordance with a preferred embodiment of the present invention, having two processors and a control interface.

A block diagram of a preferred computer system 20, in accordance with the present invention, is illustrated in FIG. 1A. Shown is a leading processor 22, a trailing processor 24 and a control interface means 26 for controlling the processors by transferring program addresses, instructions and data thereto and therebetween via busses 30, 31.

The leading processor (LP) 22 includes a program counter 32 for pointing to program instruction addresses stored in a program portion 64 of an associated memory 60. Similarly, the trailing processor (TP) 24 has a program counter 34 for pointing to instruction addresses in the program portion 74 of memory 70.

The LP memory 60 additionally includes a recovery table portion (ROM) 62 and a non volatile random access memory portion (RAM) 66. The TP memory 70 has a similar recovery table ROM 72 and a RAM 76.

In accordance with one embodiment of the invention, both processors may execute different programs which are comprised of sequentially executable segments. Apparatus and methods are disclosed for maintaining synchronization of segment execution by the processors 22, 24. In accordance with another embodiment of the invention, both processors execute the same program which is comprised of sequentially executable segments. These segments are represented by the time sequence in FIG. 1B where each program has identical segments N, N+1, N+2, N+3 and so on. The control interface 26 causes the leading processor 22 to execute the segments in time sequence as shown and causes the trailing processor 24 to execute the same sequence of segments but offset in real time from the leading processor 22 by one segment. It should be understood that the term "adjacent" as sometimes used hereinafter refers to sequentially executed segments, e.g. N and N+1, or N+1 and N+2, etc.

Figure 1B:
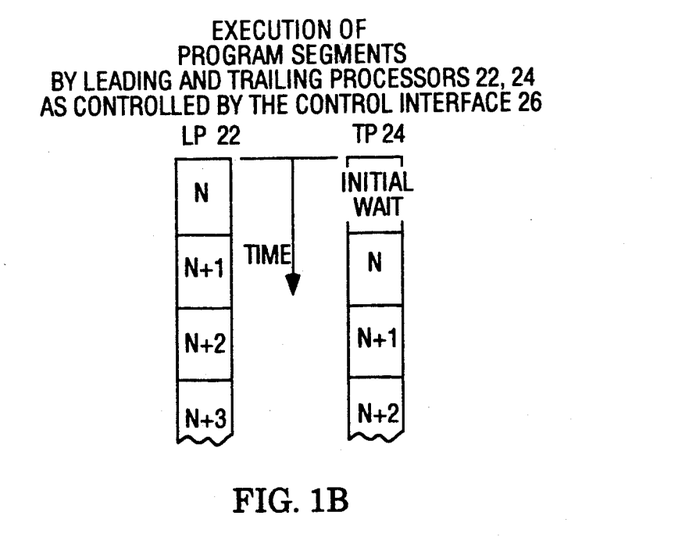

In order for the trailing processor 24 to always execute the program segment that had previously been executed by the leading processor 22, the control interface 26 causes traling processor 24 to initially wait, as shown in FIG. 1B, during the execution of the first program segment N by the leading processor 22. The control interface 26 insures that the processors start the execution of each program segment synchronously. In order to achieve this control of segment execution by the leading processor 22 and the trailing processor 24, the control interface 26 includes status register 36 for indicating status and storage registers 38 for holding initial segment instruction addresses.

Figure 2:
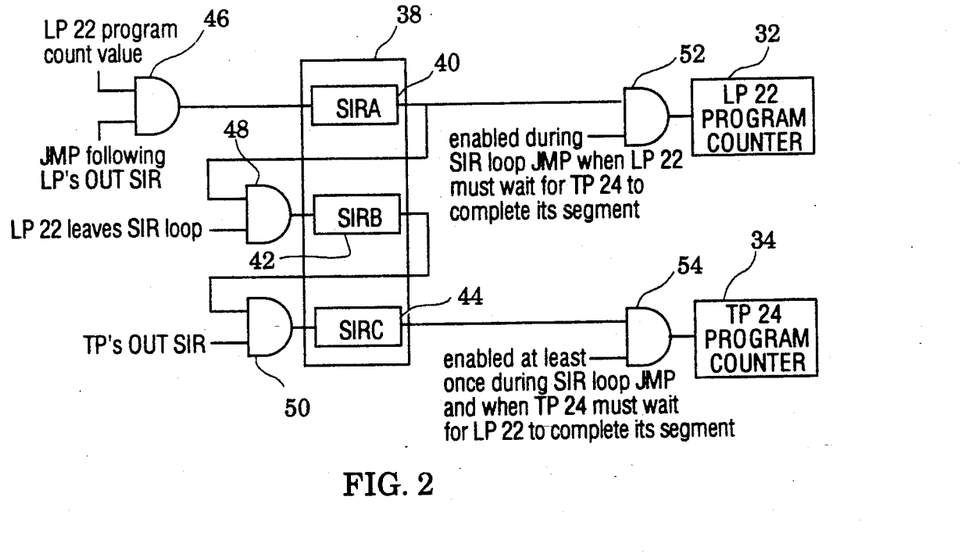
FIG. 2 illustrates exemplary gate logic for transferring an initial instruction address for a segment executed by the leading processor to a trailing processor for subsequent segment execution and for causing each processor to remain in a wait (SIR) loop until the other processor has completed segment execution.

FIG. 2 illustrates exemplary gate logic for transferring the initial segment instruction address to the TP program counter 34. Shown are storage registers 38 in the form of three segment identification registers (SIR) denoted SIRA 40, SIRB 42 and SIRC 44. The SIR registers are connected by data transfer logic 46, 48 and 50 symbolically represented by AND gates in FIG. 2. In addition, FIG. 2 shows how the first processor to complete segment execution is forced to wait (i.e. wait loop) until the other processor completes its segment.

More specifically, it should be noted that a segment initial instruction address is written into SIRA register 40 through logic gate 46. A segment initial instruction address is written into SIRC register 44 through logic gate 50. The address contained in SIRA register 40 is the program counter 32 value to start execution of a program segment by leading processor 22. The address in the SIRC register 44 is used to initiate program counter 34 to start execution of a program segment by trailing processor 24. SIRB register 42 is used to transfer the address contained in SIRA register 40 to the SIRC register 44 when TP 24 completes its segment.

Program counter 32 contents are written into SIRA register 40 when LP 22 completes a segment execution and is ready to start execution of the next segment. For example, in FIG. 1B the initial instruction address of segment N+1 is written into SIRA register 40 when LP 22 completes segment N. When LP 22 started execution of seement N, the contents of SIRA register 40 were written into SIRB register 42. For the special cases of startup or resume after recovery (FIG. 6), when TP 24 detects that LP 22 has completed execution of the first segment, it executes the OUT SIR instruction which writes the contents of SIRB register 42 into SIRC register 44. Thus in the FIG. 1B example, the initial instruction address of SIRB register 42 of segment N is written into SIRC register 44.

At all other times the contents of SIRB register 42 are written into SIRC register 44 when TP 24 completes execution of a segment. Furthermore, TP 24 is forced to be in a wait loop by enabling gate 54 for at least one jump instruction. This has the effect of forcing the contents of SIRC register 44 into TP's program counter 34. Gate 54 is enabled to maintain a wait (SIR) loop in the event TP 24 completes segment execution prior to LP 22 completing segment execution. Similarly, gate 52 is enabled to maintain LP 22 in a wait (SIR) loop in the event LP 22 completes segment execution prior to TP 24 completing segment execution. In the FIG. 1B example, TP 24 is ready to start executing segment N when LP 22 is ready to start executing segment N +1. Thus the trailing processor 24 always executes the segment that the leading processor 22 has just completed.

As stated previously, the control interface 26 includes a status register 36 for detecting the progress of segment execution by leading processor 22 and trailing processor 24. The status bits of register 36 are listed and defined in FIG. 3. The use of all of these bits will be explained but for the present only bits 0 through 3 will be examined. Bits 0 and 1 indicate segment execution status of trailing processor 24 (FIG. 1A) while bits 2 and 3 indicate segment execution status of leading processor 22 (FIG. 1A).

After the leading processor 22 executes a final segment instruction, an instruction OUT SIR is executed followed by a jump instruction JMP. Status bit 3, LP Start Segment, is set to 1 at the time of execution of the OUT SIR instruction and status bit 2, LP SIR Loop, is set to 1 at the time of execution of the JMP instruction. Status bits 1 and 0 are set to 1 when the equivalent segment instructions are executed by trailing processor 24.

Figure 4:
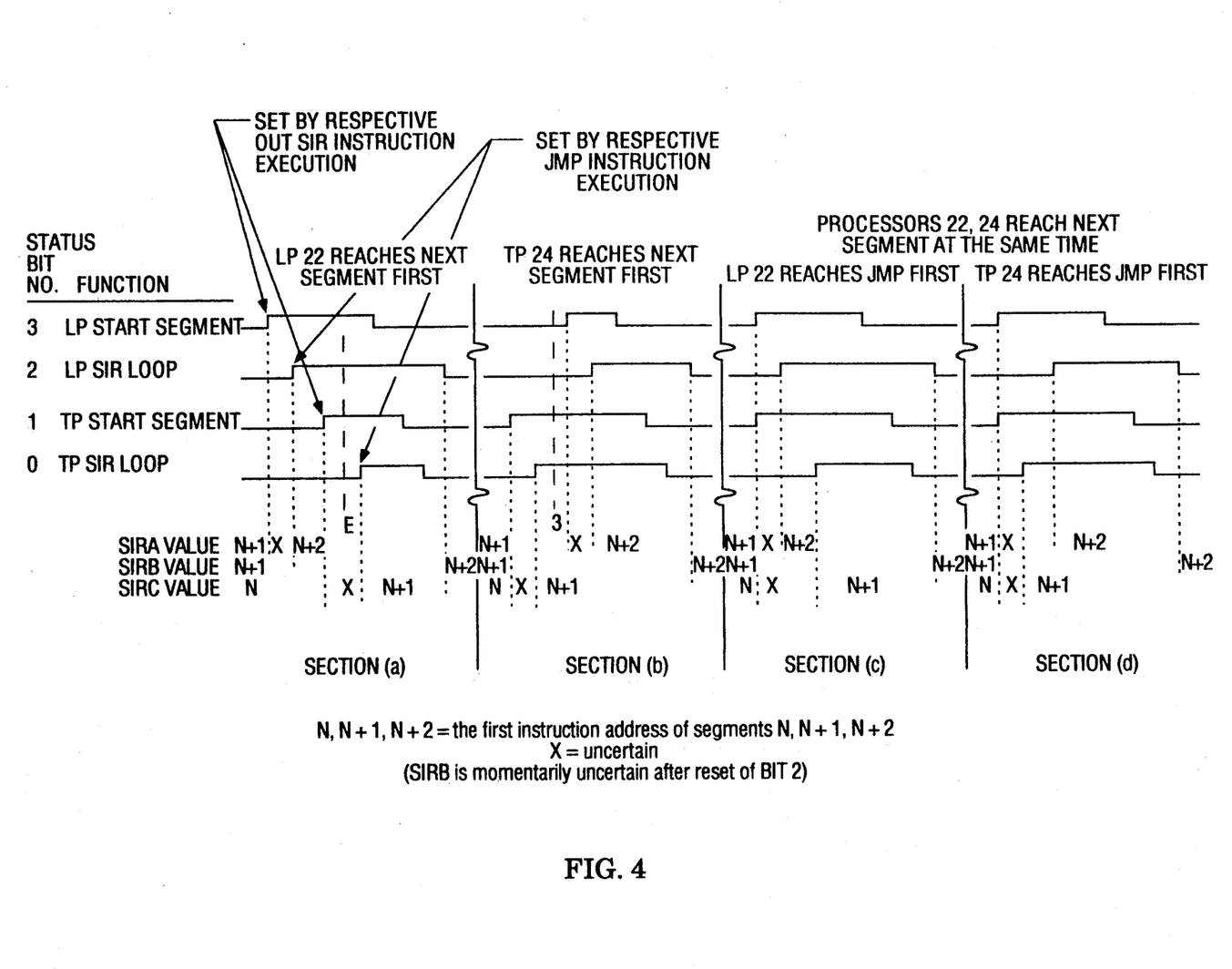
FIG. 4 is a timing diagram showing status register content and segment identification register (SIR) content relative to the execution of segment instructions by the leading processor and the trailing processor.

The relationship between status bits 0 through 3, the SIR registers, and the execution of segment instructions by the processors 22 and 24 is best seen in FIG. 4 which comprises a timing diagram depicting status bits 0 through 3 and the resulting loading of the SIR registers 40, 42 and 44. FIG. 4 is divided into four sections which respectively depict:

(a) LP 22 reaches next segment prior to completion by TP 24
(b) TP 24 reaches next segment prior to completion by LP 22
(c) Processors reach next segment at the same time but LP 22 reaches JMP instruction first
(d) Processors reach next segment at the same time but TP 24 reaches JMP instruction first.

Note in Section (a) that bit 3 and, subsequently, bit 2 are set to 1 upon the execution of the OUT SIR and JMP instructions. Bits 1 and 0 are set upon the execution of the equivalent instructions after the trailing processor 24 completes its segment execution. These two instructions executed after completion of each segment are the only additional instructions required to assure that trailing processor 24 executes a program offset by one segment from that executed by leading processor 22. It should be understood that these two instructions are executed at the boundary between adjacent program segments.

To understand the timing diagram of FIG. 4, it should be observed that at the left side of each section of FIG. 4 the leading processor 22 is completing segment N+1 and trailing processor 24 is completing segment N as indicated by the content of the SIRA and SIRC registers. The content of the SIR registers changes from left to right are indicated by the status bits 0-3. In section (a), for instance, SIRA register 40 contains the segment N+1 instruction address until status bits 3 and 2 are set at the end of segment execution to indicate its content has been changed to segment N+2 instruction address. In a similar manner, the content of SIRC register 44 is changed from the segment N instruction address to segment N+1 instruction address between status bits 1 and 0 being set.

The address for the first instruction of segment N+1 is written into SIRC register 44 from the SIRB register 42 (FIG. 2) which had held it during the execution of that segment by leading processor 22. The bits 0 through 3 are reset to 0 in the manner described in FIG. 3 and shown in FIG. 4. The LP SIR Loop bit 2 is always the last to be reset and changes the content of SIRB register 42 to the address for the first instruction of segment N+2 which is the segment to be now executed by the leading processor 22.

In this way, in section (a) of FIG. 4, the trailing processor 24 is caused to execute the segment that was just completed by the leading processor 22 while the leading processor 22 is caused to execute the next segment in the program sequence. Both processors begin segment execution when the LP SIR Loop bit (status bit 2) is reset.

Sections (b), (c) and (d) of FIG. 4 show other possible relationships of segment completion by the processors 22 and 24. It is seen that the updating of the SIRA register 40, the SIRB register 42 and the SIRC register 44 is conducted as described above. The content of the SIRB register 42 is always transferred to the SIRC register 44 when the setting of the TP SIR Loop bit 0 occurs prior to the SIRB register 42 being updated from the SIRA register 40 when the LP SIR Loop bit 2 is reset at the end of the SIR loop sequence.

Figure 5A:
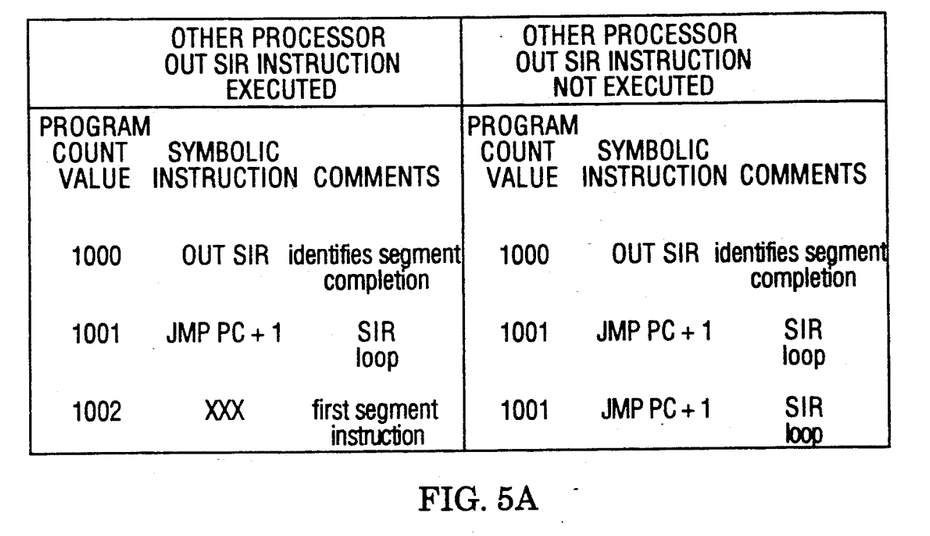
FIGS. 5A and 5B illustrate wait loop management to synchronize the leading processor and the trailing processor.
Figure 5B:
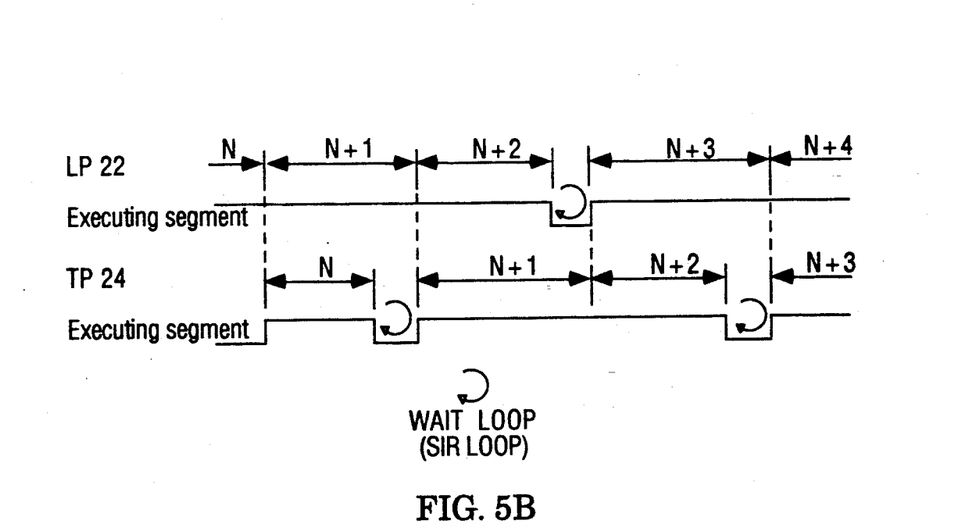

FIGS. 5A and 5B depict segment start management to synchronize the leading processor 22 and the trailing processor 24. FIG. 5A shows the two program instructions, OUT SIR and JMP, that precedes each segment. They are shown, as an example, to have the memory addresses of 1000 and 1001. As shown at the left of FIG. 5A, if the other processor has also executed the OUT SIR instruction, indicating it has completed its segment execution, the JMP instruction indexes its program counter by one and the program begins executing from memory address 1002. If, instead, the other processor has not executed its OUT SIR instruction then, as shown at the right of FIG. 5A, the JMP instruction will get the address 1001 from the SIRA register 42 or the SIRC register 44 as the next instruction address. This initiates a wait loop, alternatively called a "SIR loop" in the status bits, which continues until the other processor executes its OUT SIR instruction.

The JMP instruction attempts to move the program counter to the first instruction following the JMP instruction. However, the hardware (FIG. 2) blocks this instruction address from program memory and substitutes in its place the contents of SIRA register 40 (via gate 52) or SIRC register 44 (via gate 54) as appropriate. This makes the JMP instruction jump to itself. TP 24 is forced to execute one such loop, thereby insuring that it executes the segment just executed by LP 22 even if LP 22 does not execute segments in the same sequence that they are stored in program memory. When both processors are ready to begin new segment execution, the JMP instructions are allowed to execute normally.

This wait loop is illustrated in the timing diagram of FIG. 5B. Whenever a processor completes execution of a segment prior to the other processor completing execution of its segment, the first processor goes into a segment wait loop as shown. Thus the processors are controlled to start the next segment synchronously. The hardware logic that steers the JMP instruction to either the next segment instruction or into a SIR loop instruction is controlled by the appropriate status bits 1 or 3 of the status register 36. As seen at the left of FIG. 4 the OUT SIR instruction execution in a processor sets the start segment bit for that processor.

Referring back to FIG. 2, it may be seen that the commands correspond to the description of the timing diagram of FIG. 4. The next program segment count value is written into SIRA register 40 when the JMP instruction following OUT SIR is executed. This is accomplished through logic gate 46. When the LP SIR Loop bit 2 is reset upon leading processor 22 leaving the SIR loop, the same address is written through logic gate 48 into SIRB register 42. However, prior to this update the content of SIRB register 42, which is the address of the just completed segment of the leading processor 22, is written into SIRC register 44 through logic gate 50 when the TP start segment bit 1 is set. This bit is set by the execution of the OUT SIR instruction by the trailing processor.

It may be seen, therefore, that the leading processor 22 and the trailing processor 24 are controlled to execute identical programs. The processors always execute different segments with the trailing processor 24 executing the segment previously executed by the leading processor. The processors are placed into an instruction wait loop, if necessary, upon completion of segment execution so that both processors commence execution of the next segment synchronously. It should be understood that, in accordance with one embodiment of the invention, two or more processors executing different segmented programs can also be controlled to start segment execution synchronously with the described apparatus and method.

Figure 6:
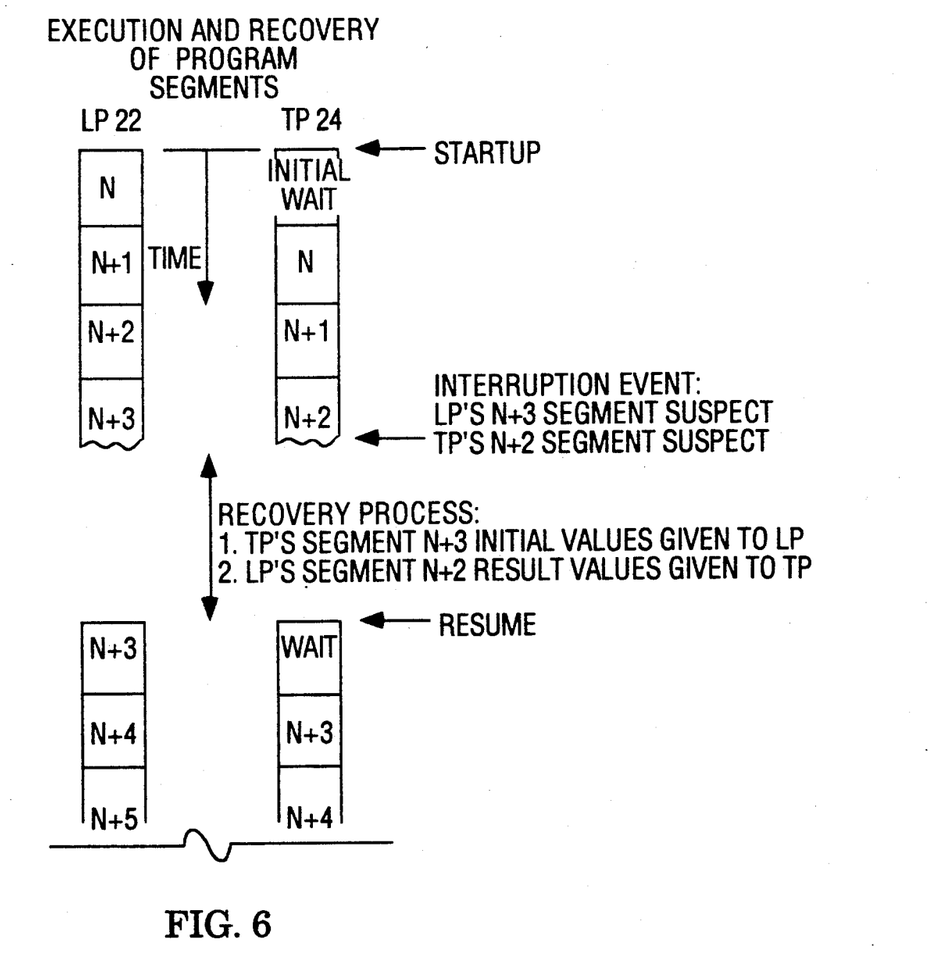
FIG. 6 is a segment execution diagram illustrating recovery after a power transient or interruption.

The two processors are also capable of recovering execution of program segments as illustrated in the segment recovery diagram of FIG. 6. If, due to any cause, e.g. detection of a nuclear event, the computer system power is interrupted during program execution, the processors, after power restoration, execute a recovery procedure and resume program execution.

In order to implement the recovery procedure, software restrictions are observed during normal operation which prevents a processor from writing to the same program variable in adjacent segments. Implementation of the recovery procedure also employs recovery tables ROM 62 and ROM 72 (FIG. 1A). These tables contain a listing of those program variables required for recovery that may be altered in each program segment.

The restriction of preventing writing to program variables in adjacent segments and the presence of the recovery table ROM 62 and the recovery table ROM 72 enables the processors 22 and 24 to look to the content of the status register 36 to find where the interruption occurred, then look to the SIRA 40, SIRB 42, and SIRC 44 registers to find the program segment identification, then look to the recovery table ROM 62 and the recovery table ROM 72 for those variables that may have been altered in the identified segments and, finally, access the values of these variables in the RAM 66 and RAM 76 where program variable changes take place. For the recovery strategy to succeed after a power interruption, the RAM 66 and RAM 76 should be non volatile memory. This means that, other than the locations being accessed when the event occurred, the memory contents are not altered by the event or any resulting power-off condition. Only those variables that need to be recovered, require the non volatile type of memory.

The leading processor 22 may then repeat execution of the interrupted segment. Once it has completed this segment, the trailing processor 24 then receives from the leading processor 22 the initial segment values and initiates execution of the segment. Thereafter, both processors continue to execute segments as illustrated in FIG. 6. Because of the restriction against writing to variables in adjacently executed segments, one processor's variable values in RAM 66 or RAM 76 forms a resource of values available to the other processor in the event of power interruption.

Figure 7:
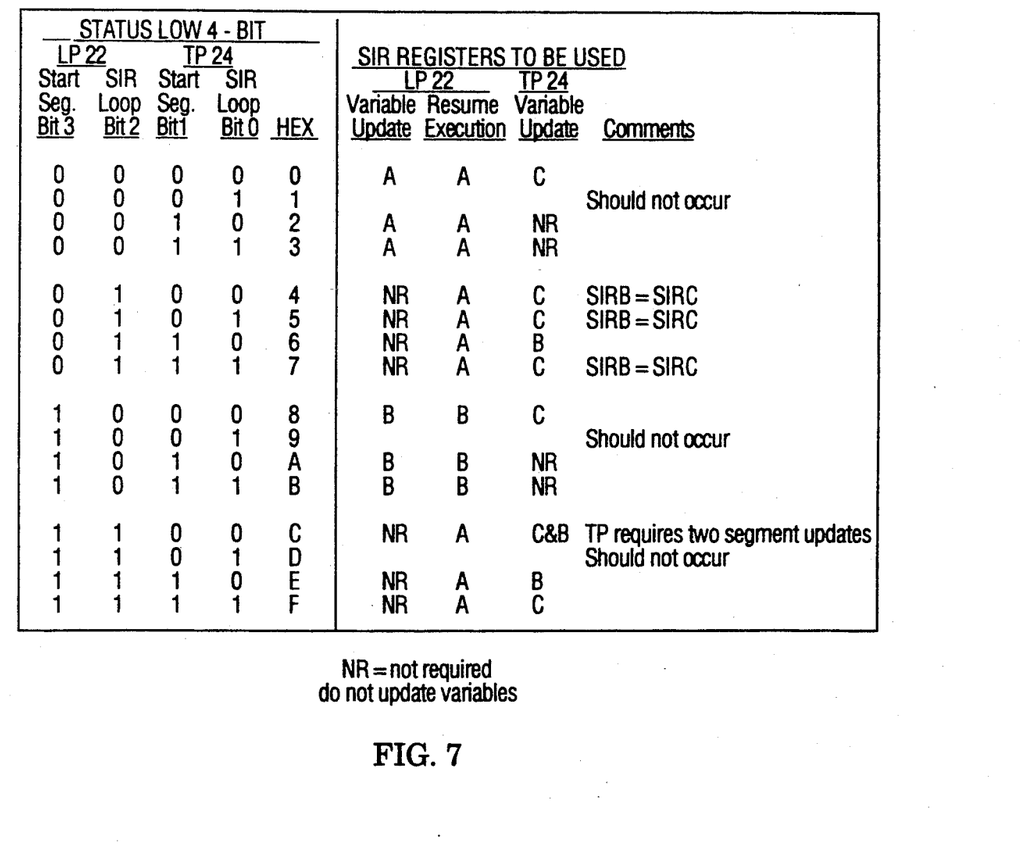
FIG. 7 is a recovery strategy table indicating the use of the status register contents and the SIR registers content in segment recovery and resumption of execution.

The execution status as reported by the status register 36 is used in the recovery strategy table of FIG. 7. As illustrated in this figure, the leading processor 22 can make a decision based on status bits 0 through 3 as to the SIR register 40 or 42 content to use in accessing the portion of the recovery table ROM 62 that will contain the designation of the possibly altered variables. The indicated SIR register 40 or 42 will also indicate to the leading processor 22 what segment to resume execution on.

In addition the trailing processor can make a decision based on status bits 0 through 3 as to which SIR register content to use in accessing the portion of the recovery table ROM 72 that will contain the designation of the possibly altered variables. LP 22 obtains variable values from TP 24 that allow it to repeat execution of a segment and produce the same results that would have been produced if the event interruption had not occurred. TP 24 obtains variables values (results) from LP 22 for segment(s) that it had not executed completely or will not execute when execution resumes following recovery.

This process is best understood by working through some examples in which the strategy table of FIG. 7 is used in conjunction with the timing diagram of FIG. 4. It should be recalled that each section of FIG. 4 represents the situation where leading processor 22 is completing execution of segment N+1 and trailing processor 24 is completing execution of segment N.

For simplicity in explanation, the sixteen different conditions of status bits 0-3, depicted in FIG. 7, will be referred to by their hexadecimal code equivalent 0-9, A-F. Referring back to FIG. 4 this can be seen to be at the dashed line indicated by the numeral 3 in section (b). Since the trailing processor 24 has completed segment N, as indicated by the execution of the two instructions OUT SIR and JMP, but the leading processor failed to complete the segment N+1 it follows that the leading processor should resume execution of segment N+1 after updating any variables indicated in section N+1 of the recovery table ROM 64. This indeed is the instruction contained in SIRA register 40 as shown at the left side of section (b) of FIG. 4.

The SIR REGISTERS TO BE USED portion of FIG. 7 indicates that the trailing processor 24 need not look for any variable recovery before resumption of execution, but only wait for the content of the SIRB register 42 to be passed to it when the leading processor 22 completes the first segment following recovery.

As a second example assume that the status bits 0 through 3 in FIG. 7 are in the hexadecimal E configuration. Referring back to FIG. 4 this can be seen to be at the dashed line indicated by the letter E in section (a). Since the leading processor 22 has completed its segment, as indicated by the execution of the two instructions OUT SIR and JMP, it does not need to update any variable and may proceed with the execution of the next segment. The recovery table in FIG. 7 indicates this and directs the leading processor to look to the content of the SIRA register 40 for the segment to resume execution on. As seen in section (a) of FIG. 4 the SIRA register 40 says the segment to resume is N+2 since the segment N+1 was successfully completed.

The SIR REGISTERS TO BE USED portion of FIG. 7 indicates that the trailing processor 24 should look to the content of the SIRB register 44 for the recovery table ROM 72 pointers to variables of segment N+1 which TP 24 needs since it will not execute this segment following recovery. Following recovery LP 22 will start execution at the segment indicated by SIRA register 40 which is N+2 in this example. Since TP 24 waits while LP 22 executes the first segment following recovery, the first segment to be executed by TP 24 following recovery will also be N+2. Thus, TP 24 completed executing segment N before the event interruption and will execute N+2 following recovery so it will not have the results produced in segment N+1 unless it gets them from LP 22 during recovery.

Thus the recovery strategy illustrated in FIG. 7 may be used, given that the processors 22 and 24 write to the same variable only in alternately executed segments. Recovery is accomplished, as described above, with the availability of the status register 36 status bits, the contents of the SIR registers 40, 42 and 44 which identify the location of segment variables in the recovery table ROM's 62 and 72 and the variable values in the non volatile RAM's 66 and 76.

Figure 3:
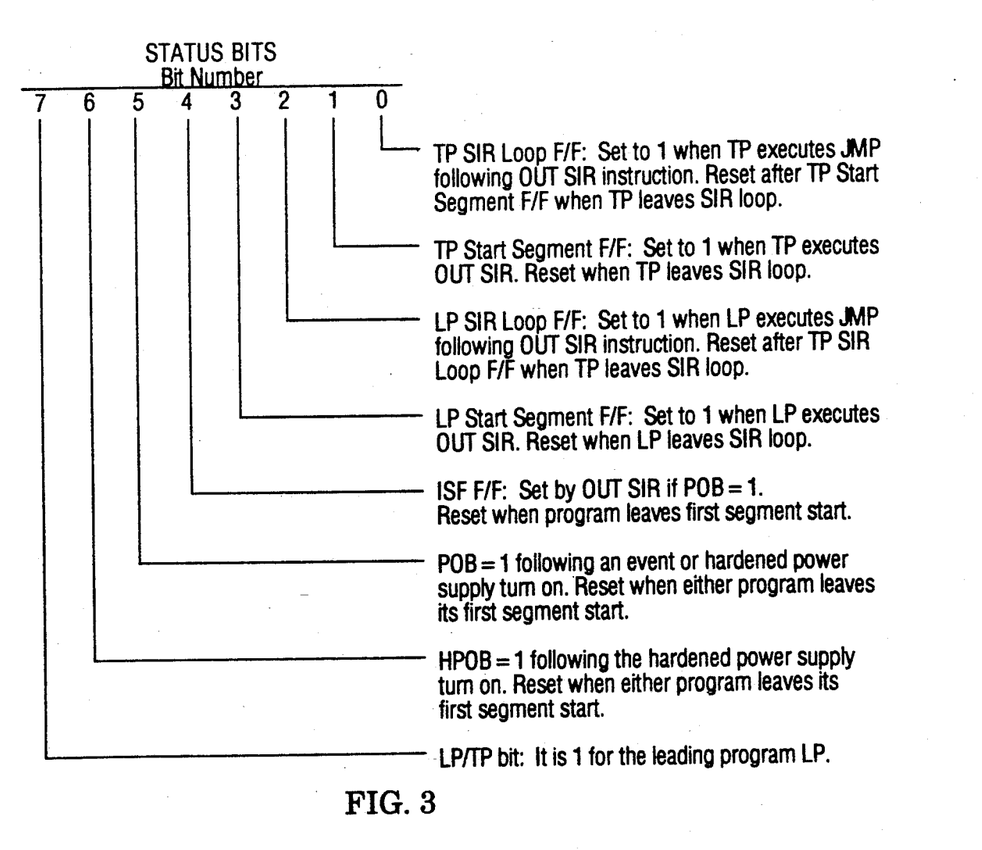
FIG. 3 is a diagram illustrating the format of status bits.
Figure 8:
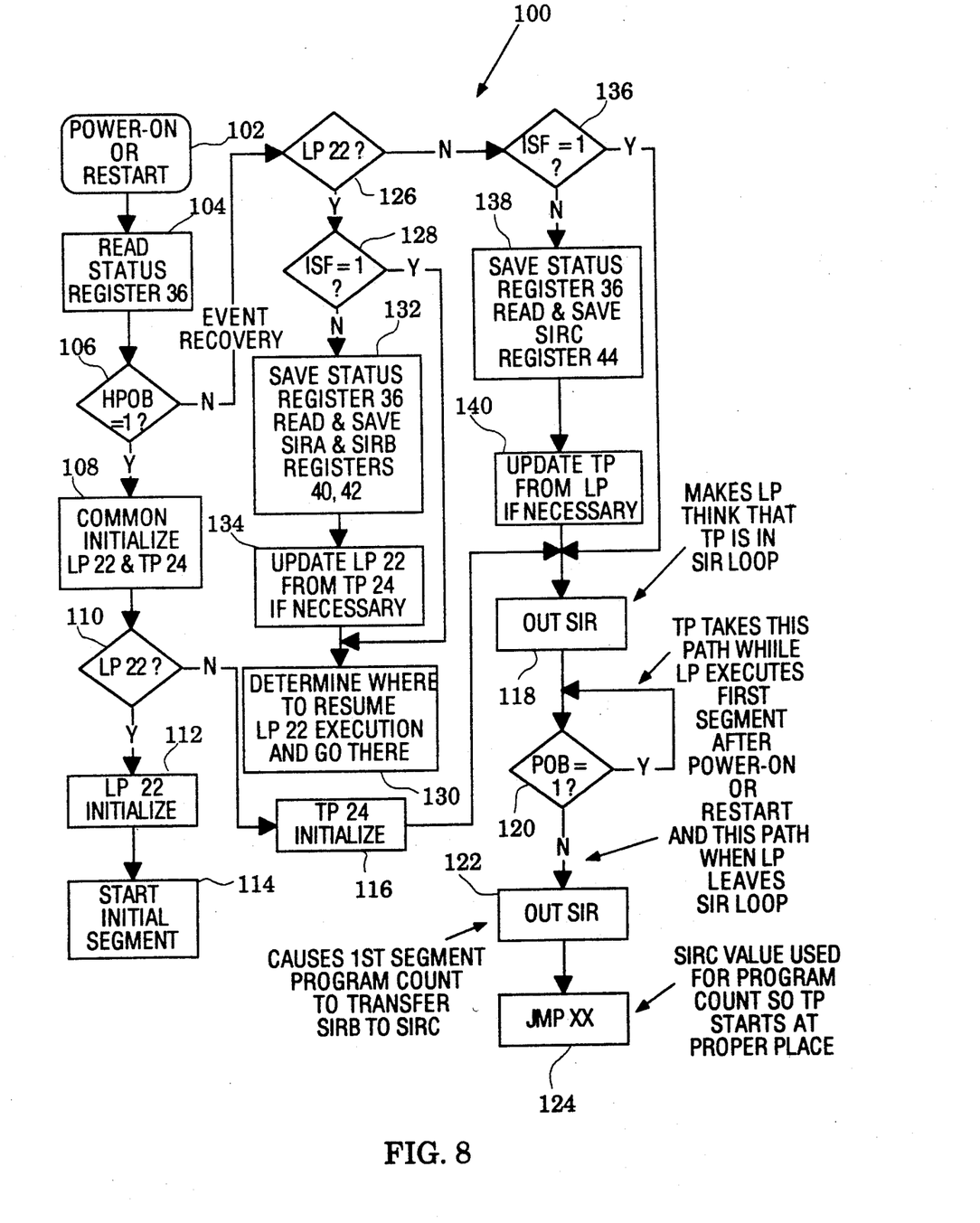
FIG. 8 is a flowchart illustrating power-on or event restart recovery.

The use of bits 4 through 7 of the status register 36, which are defined in FIG. 3, may best be followed by observing the flowchart 100 of FIG. 8 which illustrates power-on or event recovery. Starting at the power-on or restart terminus 102 in the upper left, the system reads the status register 36 as indicated in task block 104 and then makes the HPOB=1? decision of decision diamond 106. HPOB (hardened power on bit) bit 6 indicates whether a restart from a power transient is under way or an initial system turn on is in progress. If it is an initial turn on, the system places common initial values in the program variables as indicated by the task block 108.

The leading processor 22 and the trailing processor 24 both have access to the status register. When the leading processor 22 looks at the decision LP? in decision diamond 110 (this is bit 7 which is hard wired and never changes), it is directed in task block 112 to load initial variable values from the program and start the initial segment per task block 114. When the trailing processor 24 looks at the same decision diamond 110 it is directed to load initial variable values per task block 116 and then proceed to execute an OUT SIR instruction as called for by task block 118. Since this is the initial segment, as seen at the beginning of the time line in FIG. 6, the execution of this instruction is needed so that the leading processor 22 thinks the trailing processor 24 has reached the end of a segment. Otherwise the leading processor 22 would be thrown into a SIR loop at the beginning of its initial segment.

The decision diamond 120 following the OUT SIR instruction keeps the trailing processor in a SIR loop until the leading processor 22 has completed the first segment as seen at the start of the time line in FIG. 6. The completion of the segment causes status bit 5 POB to go off thus allowing the decision diamond 120 to direct operation to task block 122. When this occurs the trailing processor 24 executes the usual two instructions at the end of a segment (in this case the end of the initial wait period in FIG. 6), these being OUT SIR and JMP as indicated in task blocks 122 and 124 and then proceeds to execute the initial segment using the instruction found in the SIRC register 44.

Looking now again at decision diamond 106 of FIG. 8, one can follow the flow chart 100 if HPOB bit 6 indicates a turn on following a power interruption. This leg is titled "event recovery" and leads to decision diamond 126 and the LP? decision again. If the leading processor 22 is being followed, it would proceed down the middle leg of the flow chart to decision diamond 128. The ISF (initial segment flip/flop) bit 4 indicates if the recovery is taking place from an interrupted prior recovery or not.

If the ISF bit 4 is low the leading processor 22 knows the status register 36 and the SIR registers 40, 42, 44 represent program execution points other than the first segment following recovery. Therefore it proceeds to task block 132, saves those registers, and then the leading processor 22 follows the instructions of FIG. 7 as indicated in task block 134 and 130; that is, it looks at the status bits 0 through 3, updates variables accordingly and resumes segment execution as directed by the SIR registers and shown in FIG. 7.

If a recovery had previously been under way the content of the status register 36 and the SIR registers 40, 42, 44 do not represent the desired program recovery point, but some point in the execution of the first segment following recovery. Therefore, for proper recovery the status register 36 and SIR register values 40, 42, 44 saved at task block 132 should be used at task block 130 as directed by conditions of FIG. 7. This permits multiple closely spaced event interruptions to occur and still recover in the same way as from a single event interruption. Task blocks 132 and 134 are only executed on the first attempt to recover if there are multiple event interruptions during the first segment execution following recovery.

If it is the trailing processor 24 that arrives at the decision diamond 126 in the recovery path of the flow chart 100 of FIG. 8, it proceeds down the right hand leg of the chart. It undertakes, at the decision diamond 136 the same activity just described for the leading processor 22 and indicated, in this leg of the flow chart 100, by task blocks 138 and 140. After this it executes the same instructions described above for initial turn on and indicated in task block 118, decision diamond 120, task block 122 and task block 124. That is, it is put into a SIR loop until the leading processor 22 completes its initial segment and then looks to the SIRC register 44 for the initial instruction address of the segment that the leading processor has just completed.

Thus the computer system 20 is able, with the status register 36, the storage registers 38, the recovery table ROM's 64 and 74, the program variables in the non volatile RAM's 66 and 76 and the fact that a program variable is never written to in adjacent segments, to follow the flow diagram 100 of FIG. 8 and the recovery strategy of FIG. 7 and recover program execution after a power interruption. That power interruption may be intentional as in the case of a nuclear event. The system may have a nuclear event detector which causes the system power to be shut off rapidly. This is necessary to protect circuits from damaging current surges due to the event. In this case the system is capable of recovery as described above for a normal power interruption.

Two or more processors executing different segmented programs can also be controlled by the computer system 20 so as to start segment execution synchronously.

The computer system 20 is also capable of self checking. Since the leading processor 22 and the trailing processor 24 are executing identical programs the results of instruction execution may be compared.

The computer system 20 also has fault tolerant capabilities since either processor may continue program execution alone.

Although the present invention has been described with reference to preferred embodiments, numerous modifications and rearrangements can be made with the equivalent result still embraced within the scope of the invention.

What is claimed is:

1. A computer system, comprising: first processor means for executing a sequence of program segments N, N+1, N+2, N+3 ... N+N and a boundary instruction between each pair of adjacent segments;
   second processor means for executing a sequence of program segments M, M+1, M+2, M+3 ... M+M and a boundary instruction between each pair of adjacent segments; and
   control means responsive to the execution of said boundary instructions for causing said first and second processor means to initiate segment execution synchronously with respect to one another.

2. A computer system as defined in claim 1 wherein said control means comprises:
   status means responsive to the execution of said boundary instructions for indicating segment execution status by said first and second processors; and
   means for causing a processor that first completes segment execution to wait until the other processor completes segment execution in order to initiate subsequent segment execution synchronously.

3. A computer system as defined in claim 2 wherein said means for causing comprises a program instruction loop.

4. A computer system as defined in claim 3 wherein said program instruction loop comprises a jump instruction to the address of said jump instruction.

5. A computer system capable of recovering program execution after a power interruption, said system comprising:
   first processor means for executing a sequence of program segments N, N+1, N+2, N+3 ... and a boundary instruction between each pair of adjacent segments;
   second processor means for executing said sequence of program segments N, N+2, N+3 ... and a boundary instruction between each pair of adjacent segments; and
   control means for causing said second processor means to execute said sequence of program segments offset in time from said first processor means execution by at least one segment.

6. A computer system as defined in claim 5 wherein said control means synchronizes the initiation of segment execution by said first and said second processor means.

7. A computer system as defined in claim 6 wherein the processor means that first completes segment execution is placed in an instruction wait loop by said control means until the other processor means completes segment execution, said first and said second processor means thereby prepared to begin subsequent segment execution synchronously.

8. A computer system as defined in claim 7 wherein said control means comprises status means for indicating segment execution completion.

9. A computer system as defined in claim 5 wherein said control means comprises a first storage means for holding identification of segments under execution by said first and said second processor means, said segment identification used by said control means to cause said second processor to execute said sequence of program segments offset in time from said first processor by at least one segment.

10. A computer system as defined in claim 9 wherein said execution offset in time is one segment.

11. A computer system as defined in claim 10 wherein said control means synchronizes the initiation of segment execution by said first and said second processor means.

12. A computer system as defined in claim 11 wherein the processor means that first completes segment execution is placed in an instruction wait loop by said control means until the other processor means completes segment execution, said first and said second processor means thereby prepared to begin subsequent segment execution synchronously.

13. A computer system as defined in claim 12 wherein said control means comprises status means for indicating segment execution completion.

14. A computer system as defined in claim 5 wherein said control means comprises a first storage means for holding identification of segments under execution by said first and said second processor means, said segment identification used by said control means to cause said second processor to execute said sequence of program segments offset in time from said first processor by one segment.

15. A computer system as defined in claim 14 wherein the execution of a program segment involves writing one or more variables; and wherein the same variable can be altered only during the execution of nonadjacent segments.

16. A computer system as defined in claim 15 wherein said first storage means is non volatile.

17. A computer system as defined in claim 16 further comprising a second non volatile storage means for storage of variables.

18. A computer system as defined in claim 17 wherein said control means comprises status means for indicating segment execution completion.

19. A computer system as defined in claim 18 wherein, upon resumption of power after a power interruption, said control means accesses said status means to determine segment execution status, accesses said first storage means to identify uncompleted segments, accesses said second storage means to recover segment variable initial values, and causes said first and said second processors to commence execution of uncompleted adjacent segments, said initial values available because said first and second processors execute said sequence of program segments offset in time by one segment and the same variable can be altered only during the execution of nonadjacent segments.

20. The system of claim 5 further including:
recovery means for reestablishing program execution by said first and second processor means upon resumption of power after a power interruption.

21. A computer system for executing a program having sequentially executable segments, comprising:
a memory;
a leading processor;
a trailing processor, each said processor having a program counter for sequentially pointing to program instruction addresses in memory;
a first means for storing segment n initial instruction address;
a first means for writing said address stored in said first storage means into said program counter of said leading processor, said leading processor thereby started on execution of said segment n;
a third means for storing segment n−1 initial instruction address;
a third means for writing said address stored in said third storage means into said program counter of said trailing processor, said trailing processor thereby started on execution of said segment n−1; and
a means for transferring said address stored in said first storage means into said third storage means subsequent to completion of segment n by leading processor;
said trailing processor thereby prepared to subsequently execute said segment n previously executed by said leading processor.

22. A computer system as defined in claim 21 wherein said transfer means comprises;
a second means for storing segment initial instruction addresses;
a second means for writing said address stored in said first storage means into said second storage means subsequent to start of segment n execution by said leading processor; and
a means for loading said address stored in said second register into said third storage means subsequent to completion of segment n by leading processor;
said trailing processor thereby prepared to subsequently execute said segment n previously executed by said leading processor.

23. A computer system as defined in claim 22 further comprising:
means for detecting program segment execution status of said leading processor and said trailing processor, said status identifying the processor which first completes its segment execution, said identification remaining valid until both said processors complete their segment execution;
a fourth means, responsive to said detection means, for writing a first address in said program counter of said identified processor that contains an instruction to jump to said first address, said identified processor thereby placed in an instruction loop until both said processors have completed their segment execution;
said processors thereby enabled to start subsequent segment instruction execution synchronously, said processors thereby executing segments with said trailing processor executing a segment previously executed by said leading processor.

24. A computer system as defined in claim 23 wherein said memory has:
a read only memory, said memory containing identification of program variables for each program segment;
a first non volatile random access memory, said first memory containing variables in segment being executed by said leading processor;
a second non volatile random access memory, said second memory containing variables in segment being executed by said trailing processor; and wherein said processors write to a program variable in alternate segments only;

said computer system thereby capable, after interruption of segment instruction execution by a power supply transient, of recovering execution of program segments by said processors using said detection means to identify status of said interrupted segments, selecting appropriate initial segment instructions in said first, second and third storage means and recovering initial variable values from appropriate said first and second memories and initiating instruction execution of said interrupted segments.

25. A computer system as defined in claim 24 wherein said power supply transient may include power supply interruption.

26. A computer system as defined in claim 25 further comprising:

means for detecting a nuclear event; and means, responsive to said event detection means, for turning off the system power supply to protect said system from said nuclear event;

said system thereby capable, after interruption of segment instruction execution by said nuclear event of recovering execution of program segments.

27. A computer system for executing a program having sequentially executable segments, comprising:

a memory;

a leading processor;

a trailing processor, each said processor having a program counter for sequentially pointing to program instruction addresses in memory;

a first means for storing segment n initial instruction address;

a first means for writing said address stored in said first storage means into said program counter of said leading processor, said leading processor thereby started on execution of said segment n;

a third means for storing segment n−1 initial instruction address;

a third means for writing said address stored in said third storage means into said program counter of said trailing processor, said trailing processor thereby started on execution of said segment n−1;

a second means for storing segment initial instruction addresses;

a second means for writing said address stored in said first storage means into said second storage means subsequent to start of segment n execution by said leading processor; and a means for loading said address stored in said second register into said third storage means subsequent to completion of segment n by leading processor, said trailing processor thereby prepared to subsequently execute said segment n previously executed by said leading processor;

a read only memory, said memory containing identification of program variables for each program segment;

a first non volatile random access memory, said first memory containing variables in segment being executed by said leading processor;

a second non volatile random access memory, said second memory containing variables in segment being executed by said trailing processor; and wherein said processors write to a program variable in alternate segments only;

said computer system thereby capable, after interruption of segment instruction execution by a power supply transient, of recovering execution of program segments by said processors using said detection means to identify status of said interrupted segments, selecting appropriate initial segment instructions in said first, second and third storage means and recovering initial variable values from appropriate said first and second memories and initiating instruction execution of said interrupted segments.

28. A computer system as defined in claim 27 wherein said power supply transient may include power supply interruption.

29. A computer system as defined in claim 27 further comprising:

means for detecting a nuclear event; and means, responsive to said event detection means, for turning off the system power supply to protect said system from said nuclear event;

said system thereby capable, after interruption of segment instruction execution by said nuclear event of recovering execution of program segments.

30. A method of recovering program execution after a power interruption comprising:

causing a first processor to execute a program comprised of a sequence of program segments N, N+1, N+2, N+3 . . . ;

causing a second processor to execute the same program comprised of said program segments N, N+1, N+2, N+3 . . . , delayed in time by at least one segment with respect to execution by said first processor;

determining after a power interruption the status of segment execution by each processor;

responding to the determined status by transferring segment variable initial values to said first processor and/or segment variable result values to said second processor; and reestablishing program execution by each processor using said variable values transferred thereto.

31. A method of reestablishing execution of a computer program after a power interruption, said method comprising the steps of:

configuring said program as a sequence of program segments N, N+1, N+2 . . . in which no program variable value is altered in adjacent ones of said segments;

executing said sequence of program segments independently with a first processor and a second processor;

writing program variable values generated in executing said sequence of program segments to a non volatile memory;

causing said second processor to execute said sequence of program segments offset from said first processor execution by at least one segment; and recovering from said non volatile memory, after said power interruption, stored program variable values for reestablishing program execution by each of said first and second processors.

32. The method of claim 31 further comprising the intermediate steps of:

storing in a non volatile memory, for each program variable, an identification of the program segments in which the value of said program variable may be altered; and storing in a non volatile memory the identification of the last program segment executed by each of said first and second processors.

* * * * *